United States Patent [19]

Schiessle et al.

[11] Patent Number: 5,255,981
[45] Date of Patent: Oct. 26, 1993

[54] TEMPERATURE SENSOR

[75] Inventors: Edmund Schiessle, Schorndorf; Khaldoun Alasafi, Schwäbisch-Gmünd; Ralf Gutöhrlein, Fellbach-Schmiden, all of Fed. Rep. of Germany

[73] Assignee: Mercedes-Benz AG, Fed. Rep. of Germany

[21] Appl. No.: 10,850

[22] Filed: Jan. 29, 1993

[30] Foreign Application Priority Data

Jan. 30, 1992 [DE] Fed. Rep. of Germany ....... 4202537

[51] Int. Cl.⁵ .............................................. G01K 7/38
[52] U.S. Cl. ................................... 374/163; 374/188; 374/142; 374/176; 252/408.1; 252/962; 324/227; 324/234; 324/236; 324/230
[58] Field of Search ............... 374/163, 187, 188, 142, 374/176; 252/408.1, 962; 324/227, 234, 236, 229, 230

[56] References Cited

U.S. PATENT DOCUMENTS

| | | | |
|---|---|---|---|
| 1,945,378 | 1/1934 | Robbins | 374/176 |
| 2,222,425 | 11/1940 | Wehe | 374/176 |
| 2,350,329 | 6/1944 | Hornfeck | 374/176 |
| 3,459,043 | 8/1969 | Young | 374/188 |
| 3,568,050 | 3/1971 | Dill | 374/176 |
| 3,950,993 | 4/1976 | Sidor | 374/176 |
| 4,869,598 | 9/1989 | McDonald | 374/176 |

FOREIGN PATENT DOCUMENTS

| | | | |
|---|---|---|---|
| 0161866 | 12/1952 | Austria | 374/176 |
| 1191593 | 4/1965 | Fed. Rep. of Germany | 374/163 |
| 2341998 | 7/1974 | Fed. Rep. of Germany | |
| 3109930 | 9/1982 | Fed. Rep. of Germany | |
| 3411980 | 10/1985 | Fed. Rep. of Germany | |
| 3416340 | 11/1985 | Fed. Rep. of Germany | |
| 0697841 | 11/1979 | U.S.S.R. | 374/176 |
| 1198392 | 12/1985 | U.S.S.R. | 374/176 |

*Primary Examiner*—William A. Cuchlinski, Jr.
*Assistant Examiner*—Diego F. F. Gutierrez
*Attorney, Agent, or Firm*—Evenson, McKeown, Edwards & Lenahan

[57] ABSTRACT

A temperature sensor has a body whose thermal expansion is evaluated in the event of a change in temperature, there being deposited on the body a layer which has a layer structure containing less than 8% by weight of phosphorus, preferably containing up to 3% by weight of phosphorus, up to 2% by weight of an element of main group IV or main group V, in particular antimony, and up to 5% by weight of a transition metal element, in particular cobalt. The percentages by weight resulting from the sum being increased up to 100% with nickel. The layer modifies the magnetic flux in a coil arrangement comprising at least one coil. This change in the magnetic flux in the coil arrangement is evaluated and the change in the magnetic flux being detected as a change in the inductance. The change in length of the body and the change in temperature are deduced therefrom.

13 Claims, 1 Drawing Sheet

U.S. Patent  Oct. 26, 1993  5,255,981
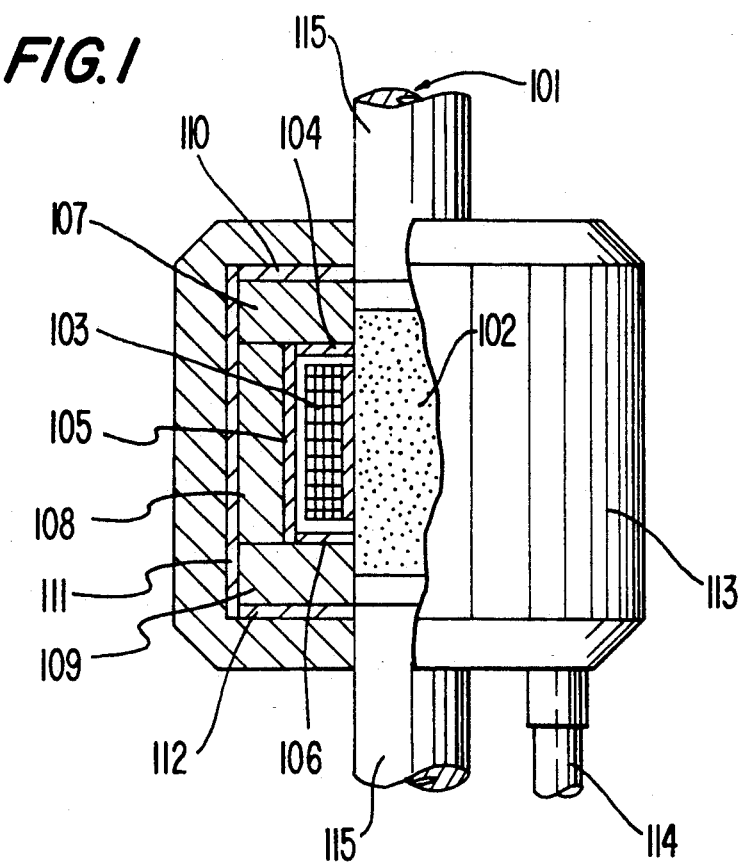
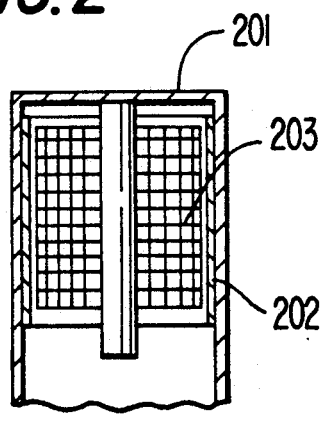
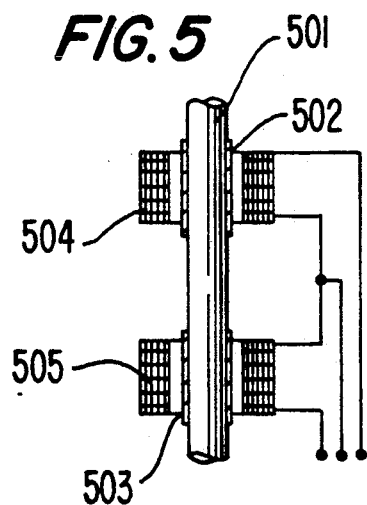
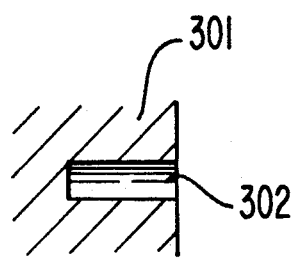
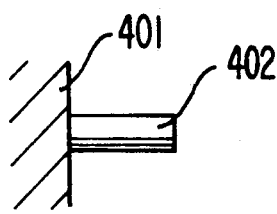

TEMPERATURE SENSOR

BACKGROUND AND SUMMARY OF THE INVENTION

The invention relates to a temperature sensor and, more particularly, to a temperature sensor having a body whose thermal expansion is evaluated in the event of a change in temperature. The magnetic flux in a coil arrangement having at least one coil is modified when the body expands. The change in the magnetic flux in the coil arrangement is evaluated and the change in the magnetic flux is detected as a change in the inductance. The change in length of the body and the change in temperature are deduced therefrom.

A temperature sensor of the above-described type is already known, for example German Patent Document 23 41 998, in which a rod-type expansion sensor, comprising a tubular expansion rod and a reference rod is permanently joined directly to an inductive detector. The reference rod is joined to the armature and the expansion rod to the pot-type cores of the detector which accommodate a coil arrangement. In the event of a change in temperature, the armature, which is joined to the reference rod, alters its position as a result of the thermal expansion of the expansion rod and as a result, the air gap, and consequently the magnetic flux in the coil arrangement, is modified. Independently of its expensive construction, its low response sensitivity is particularly regarded as disadvantageous.

A device is furthermore known for measuring a small path length by the eddy-current principle, for example German Patent Document 27 39 054 A1, in which there is disposed in a coil arrangement, a measuring component which can be acted on by a physical measurable variable as a function of distance. Measuring elements, made of weakly ferromagnetic material, for example of a chrome nickel steel, are in turn disposed on the measuring component in the region of the coil arrangement. The measuring elements act as a short-circuit winding and, depending on the distance of the coil arrangement, are fed with high frequency, and attenuate the coil arrangement to a greater or lesser degree, with the result that the varying impedance is a measure of the measurable variable.

There is therefore needed a temperature sensor of the general type constructed in such a manner that it has as high a response sensitivity as possible and operates at the same time as independently as possible of ambient conditions.

Those needs are met with a temperature sensor according to the present invention, having a body whose thermal expansion is evaluated in the event of a change in temperature. The magnetic flux in a coil arrangement having at least one coil is modified when the body expands. The change in the magnetic flux in the coil arrangement is evaluated and the change in the magnetic flux is detected as a change in the inductance. The change in length of the body and the change in temperature are deduced therefrom. On the body, a layer is deposited by atomic growth. The layer has a layer structure containing less than 8% by weight of phosphorus, preferably up to 3% by weight, up to 2% by weight of an element of main group IV or V, in particular antimony or lead, and up to 5% by weight of a transition metal element, in particular cobalt or iron. The percentages by weight resulting from the sum being increased up to 100% with nickel. The layer also expands with the body and modifies the magnetic flux as a consequence of the change in the permeability of the layer.

According to the present invention, a soft-magnetic layer is applied to a substrate which has as high a thermal coefficient of expansion as possible. The soft magnetic and magnetoelastic layer at the same time modifies the inductance of a coil. As the substrate expands as a result of a change in temperature, the permeability of the layer consequently changes-and, therefore, so does the inductance of the coil. The change in the inductance of the coil can be sensed using means which are known per se.

Other objects, advantages and novel features of the present invention will become apparent from the following detailed description of the invention when considered in conjunction with the accompanying drawings.

BRIEF DESCRIPTION OF THE DRAWINGS

FIG. 1 is a partial cross-sectional view of a first embodiment of a temperature sensor according to the invention;

FIG. 2 illustrates a second embodiment of a temperature sensor according to the invention;

FIG. 3 illustrates an application of a temperature sensor according to the invention;

FIG. 4 illustrates a further application of a temperature sensor according to the invention; and FIG. 5 illustrates a further embodiment of a temperature sensor according to the invention.

DETAILED DESCRIPTION OF THE DRAWINGS

A first exemplary embodiment of a temperature sensor according to the present invention is shown in FIG. 1. In this device, the basic structure is that a soft-magnetic and magnetoelastic layer 102 is deposited on a core 101 made of a nonmagnetic metallic material having as high a thermal coefficient of expansion as possible and a large electrical resistivity.

A suitable composition of the layer 102 having the required properties consists in adopting a layer structure containing less than 8% by weight of phosphorus, preferably up to 3% by weight of phosphorus, less than 2% by weight of antimony and less than 5% by weight of cobalt. The percentages by weight resulting from the sum are increased up to 100% with nickel. It is also possible to use another transition metal instead of cobalt Co, for example iron. Likewise, instead of antimony Sb, another element of main group IV or V, for example lead, may also be used.

The transition metal brings about an increase in the crystallization temperature of the layer from approximately 600° K to greater than 700° K. Likewise, the transition metal increases the Curie point to a value of greater than 700° K.

As a result of the high proportion of atomic bonds, the element antimony (or lead) brings about an appreciable increase in the electrical resistivity, thereby providing a particularly efficient attenuation of the eddy currents.

The phosphorus content of the layer 102 is responsible for the amorphicity and the magnetic isotropy, and, consequently, for the soft-magnetic properties of the layer 102. A P proportion of more than 3% by weight results in a decrease in the ferromagnetism and, consequently, in a decrease in the magnetostriction.

The surface of the core 101, on which the layer 102 is to be deposited, has first to be made electrically conducting so that the ions can deposit on the core 101 by reduction in the above composition. This can be done, for example, by first coating the surface by vapor deposition. Then the core 101 is immersed in a bath composed of the elements in accordance with the above list taking account of the respective percentages by weight. Under these circumstances, the layer 102 can then be deposited by chemical reduction on the surface of the core 101 at a temperature of approximately 370° K.

So that the measuring layer 102 can be effectively protected against external magnetic fields, two soft-magnetic nonmagnetostrictive layer rings 115 are also deposited in addition on the core 101 by one of the processes mentioned. The components 110, 111, 112 described below, together with the two layer rings 115, then form the magnetic screening.

To protect the measuring layer 102 mechanically and chemically, a layer having a higher P content (greater than 8% by weight of phosphorus) is then deposited in turn. The measuring layer can have a composition $A_{1-x}B_x$. A may be a mixture of, preferably, two ferromagnetic transition metals M1 and M2, where M1 may be Ni and M2 may be Co, and B can be a mixture of metalloids m1 and m2, where m1 may be P and m2 Sb. A possible quantitative ratio may be composed of $M1_{0.9}, M2_{0.1})_{0.8}(m1_{0.5}, m2_{0.5})_{0.2}$. The magnetostriction constant can in principle be varied by varying the composition of the layer. With a continuous change in the quantitative ratio of M1, M2 from 9:1 to 1:9, the magnetostriction constant goes over from a negative to a positive sign, a minimum magnetostriction being passed through at a quantitative ratio of approximately 1:1.

If the temperature sensor in FIG. 1 is now subjected to a temperature change, the core 101 expands, and along with it, so does the soft-magnetic layer 102. This alters the permeability of the layer 102 and, consequently, also the inductance of the coil 103. This change in inductance can be determined by means of evaluation circuits known per se and is a direct measure of the temperature.

It can furthermore be seen from FIG. 1, that the layer 102 is able to form the magnetic flux return path for the coil 103 with the components 104, 105 and 106. The components 104, 105 and 106 are composed of a soft-magnetic material which also exhibits a low magnetostriction. Advantageously, interference effects can be eliminated by further components. For example, the components 104, 105 and 106 may be surrounded by components 107, 108 and 109, which are spacers composed of an electrically insulating and nonmagnetic material, for example of a suitable plastic. These components may then be surrounded in turn by the components 110, 111 and 112 which, in order to provide screening from interfering external magnetic fields, are composed of a highly soft magnetic material having a high electrical resistivity. The entire arrangement in the exemplary embodiment of FIG. 1 is encapsulated in a plastic material 113. In this arrangement, the coil 103 is connected to the evaluation device, which is not shown in greater detail here, by the connector 114.

FIG. 2 shows a second exemplary embodiment of a temperature sensor according to the invention. In this case, the layer 202 is provided on the inside surface of a cylindrical body 201 and modifies the inductance of the coil 203 as a result of modifying the magnetic field on the outside of the coil 203 as a result of a change in the permeability of the layer 202 as a consequence of a change in temperature. Analogously to the construction shown in FIG. 1, further components may be provided for the purpose of screening from external magnetic fields.

FIG. 3 shows an application of a temperature sensor according to the invention, it being intended to insert a temperature sensor according to the invention into a bore 302 in a body 301 whose temperature is to be measured. For this purpose, a sensor in accordance with the exemplary embodiment of FIG. 2 is particularly suitable, and in this case the diameter of the bore 302 should advantageously correspond to the outside diameter of the body 201 in order to provide as effective a heat transfer between the body 301 and the temperature sensor as possible.

FIG. 4 shows a further application of a temperature sensor according to the invention, and in this case, the temperature sensor 402 is to be mounted on the body 401 whose temperature is to be measured. In this application, the sensor in accordance with the exemplary embodiment of FIG. 1, is particularly suitable because of its simpler production.

FIG. 5 shows a further example of a temperature sensor in which two layers 502 and 503 are deposited on the body 501, one layer 502 having a negative magnetostriction constant. That is to say, its magnetic permeability decreases under mechanical load. At the same time, the layer 503 has a positive magnetostriction constant. That is to say, its magnetic permeability increases under mechanical load. Consequently, if the layers 502 and 503 are subjected to a mechanical load due to a temperature change, the inductances of the coils 504 and 505 are modified in the opposite sense. A substantially improved sensitivity of the temperature sensor can consequently be achieved by evaluating the inductances, which change in the opposite sense. Equally, the two layers 502 and 503 may also be provided on different bodies. A particularly sensitive measurement of temperature differences is then possible.

In this connection, the different magnetostriction constants of the layers 502 and 503 are produced by modifying the layer composition, as explained, for example, in connection with FIG. 1.

It is likewise possible to provide two different bodies with layers having different magnetostriction constants and then to measure temperature differences by means of these two bodies.

The casings composed of one material and comprising a plurality of components in the embodiment in accordance with FIG. 1 may, however, also comprise only one component of the appropriate shape.

The deposition of the layer 102, 202, 502, 503 and of the layer rings 115 by atomic growth may be carried out by chemical reduction at the surface, by electrolytic deposition, by the PVD (physical vapor deposition) or CVD (chemical vapor deposition) process or by ion implantation, and by variants of the processes mentioned (plasma, laser, ultrasound and the like).

Furthermore, for the purpose of optimizing the electrical resistivity and the magnetic properties of the layer, the layer may also be doped with traces of rare earth metals.

Fine solid powders, for example oxides, carbides or plastics, such as Hostaflon or the like, may also furthermore be added to the layer. This achieves the result that the solids dispersively incorporated in the layer make the migration of the Bloch walls difficult and, consequently, increase the magnetostriction properties of the layer.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A temperature sensor, comprising:
a body with a thermal expansion that is evaluated in the event of a change in temperature;
a coil arrangement having at least one coil has its magnetic flux modified when the body expands, said modification in the magnetic flux being evaluated and detected as a change in the inductance, a change in the length of said body and a change in temperature being deduced therefrom;
at least one layer deposited by atomic growth on said body, said layer having a layer structure containing less than 8% by weight of phosphorous, up to 2% by weight of an element of one of main groups IV and V, and up to 5% by weight of a transition metal element, said percentages by weight resulting from the sum being increased up to 100% with nickel, wherein the layer expands with said body and modifies the magnetic flux as a consequence of the change in permeability of the layer.

2. A temperature sensor according to claim 1, wherein said layer structure contains up to 3% by weight of phosphorous.

3. A temperature sensor according to claim 2, wherein said element of one of main groups IV and V is one of antimony and lead, and wherein the transition metal element is one of cobalt and iron.

4. A temperature sensor according to claim 1, wherein the coil arrangement comprises a coil which is disposed coaxially with the body and surrounds the body, and wherein the top, bottom and outside surface of the coil are surrounded by components composed of a soft-magnetic material which has a low magnetostriction.

5. A temperature sensor according to claim 4, wherein the components surrounding the coil arrangement are surrounded by further components composed of an electrically insulating and nonmagnetic material.

6. A temperature sensor according to claim 5, wherein the insulating and non-magnetic material is a plastic.

7. A temperature sensor according to claim 5, wherein the components and further components are furthermore surrounded by additional components composed of a highly soft-magnetic material having a high electrical resistivity.

8. A temperature sensor according to claim 7, wherein the temperature sensor resulting from the additional components is encapsulated in a plastic material.

9. A temperature sensor according to claim 1, wherein the coil arrangement comprises a coil which is disposed coaxially with the body, the body having an internal bore and the layer being provided on the side of the internal bore of the body, and wherein the coil is disposed in the internal bore of the body, and the top, bottom and inside surfaces of the coil are surrounded by components composed of a soft-magnetic material which has a low magnetostriction.

10. A temperature sensor according to claim 1, wherein there are provided two coils, and wherein there are provided on the body two layers which have a different magnetostriction constant, each of the two layers modifying the inductance of one of said two coils of the coil arrangement in each case and the change in length of the body and the change in temperature being deduced therefrom.

11. A temperature sensor according to claim 1, wherein the laye is doped with traces of rare-earth metals.

12. A temperature sensor according to claim 1, wherein fine solid powders are added to the layer.

13. A temperature sensor according to claim 1, wherein layer rings ar additionally located on the body at an axial distance from the layer, said layer rings having an identical structure to said layer.

* * * * *